United States Patent
Mastrangelo et al.

(10) Patent No.: US 11,762,131 B2
(45) Date of Patent: Sep. 19, 2023

(54) LOW-POWER LARGE APERTURE ADAPTIVE LENSES FOR SMART EYEGLASSES

(71) Applicant: University of Utah Research Foundation, Salt Lake City, UT (US)

(72) Inventors: Carlos Mastrangelo, Salt Lake City, UT (US); Nazmul Hasan, Salt Lake City, UT (US); Kim Hanseup, Salt Lake City, UT (US)

(73) Assignee: UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 355 days.

(21) Appl. No.: 17/037,045

(22) Filed: Sep. 29, 2020

(65) Prior Publication Data

US 2021/0011204 A1  Jan. 14, 2021

Related U.S. Application Data

(63) Continuation of application No. 16/068,328, filed as application No. PCT/US2017/012537 on Jan. 6, 2017, now Pat. No. 10,838,116.

(Continued)

(51) Int. Cl.
*G02B 3/14* (2006.01)
*G02B 27/01* (2006.01)
(Continued)

(52) U.S. Cl.
CPC ........... *G02B 3/14* (2013.01); *G02B 27/0172* (2013.01); *G02B 27/0176* (2013.01);
(Continued)

(58) Field of Classification Search
CPC .. G02B 3/14; G02B 27/0172; G02B 27/0176; G02B 2027/0138; G02B 2027/0178; G02C 7/085; G06F 3/016
See application file for complete search history.

(56) References Cited

U.S. PATENT DOCUMENTS 5,305,731 A   4/1994 Buchholtz
6,188,526 B1  2/2001 Sasaya et al.
(Continued)

FOREIGN PATENT DOCUMENTS

KR  10-20110100549 A1  9/2011
WO  WO 2014147060 A1   9/2014
(Continued)

OTHER PUBLICATIONS

Berge et al.; "Variable Focal Lens Controlled by an External Voltage: An Application of Electrowetting;" The European Physical Journal E; (Oct. 2000); pp. 159-163; vol. 3, No. 2; <doi: 10.1007/s101890070029 >.

(Continued)

*Primary Examiner* — James C. Jones
(74) *Attorney, Agent, or Firm* — THORPE NORTH AND WESTERN LLP; Erik S. Ericksen

(57) ABSTRACT

A variable focus optical device (100) can include first optically transparent membrane (102) and a second membrane (104) that at least partially define a chamber (106) retaining an optically transparent liquid. A transparent piston (110) is attached to the second membrane (104). At least one actuator (112*a-c*) is operatively coupled to the transparent piston (110) and configured to move to change a focal length of the variable focus optical device (100) via actuation of the transparent piston (110). Three curved bimorph actuators (112*a-c*) can surround and be coupled to the piston (110) for actuation of the piston (110) to generate a plano-convex or plano-concave lens via the membranes (102, 104). A smart (Continued)

eyeglasses system includes a pair of variable focus optical devices (100), an object distance sensor, a battery, optional eye-tracking camera(s), and a microcontroller, collectively used for purposes of sensing distance of objects and adjusting said focal length via the variable focus optical devices (100).

19 Claims, 6 Drawing Sheets

Related U.S. Application Data

(60) Provisional application No. 62/367,594, filed on Jul. 27, 2016, provisional application No. 62/387,854, filed on Jan. 6, 2016.

(51) Int. Cl.
*G02C 7/08* (2006.01)
*G06F 3/01* (2006.01)

(52) U.S. Cl.
CPC ............. *G02C 7/085* (2013.01); *G06F 3/016* (2013.01); *G02B 2027/0138* (2013.01); *G02B 2027/0178* (2013.01)

(56) References Cited

U.S. PATENT DOCUMENTS

| | | | |
|---|---|---|---|
| 7,142,369 B2 | 11/2006 | Wu et al. | |
| 7,453,646 B2 | 11/2008 | Lo | |
| 7,813,047 B2 | 10/2010 | Wang et al. | |
| 8,087,778 B2 | 1/2012 | Gupta et al. | |
| 8,215,770 B2 | 7/2012 | Blum et al. | |
| 8,282,004 B2 * | 10/2012 | Wang ................. | G02B 3/14 359/666 |
| 8,317,701 B2 * | 11/2012 | Livne ................. | A61B 3/16 600/398 |
| 8,382,280 B2 | 2/2013 | Gupta et al. | |
| 8,477,425 B2 * | 7/2013 | Border ................. | G02B 27/017 359/13 |
| 8,570,658 B2 | 10/2013 | Nibauer et al. | |
| 8,717,681 B2 | 5/2014 | Griffith et al. | |
| 8,797,654 B2 | 8/2014 | Blum | |
| 8,885,139 B2 | 11/2014 | Peyghambarian et al. | |
| 8,958,911 B2 | 2/2015 | Wong et al. | |
| 9,200,887 B2 | 12/2015 | Potsaid et al. | |
| 2004/0115067 A1 | 6/2004 | Rush et al. | |
| 2005/0001367 A1 | 1/2005 | Taya et al. | |
| 2008/0259463 A1 | 10/2008 | Shepherd | |
| 2012/0113092 A1 | 5/2012 | Bar-Zeev et al. | |
| 2012/0127062 A1 | 5/2012 | Bar-Zeev et al. | |
| 2012/0268712 A1 | 10/2012 | Egan et al. | |
| 2012/0300171 A1 | 11/2012 | Gupta et al. | |
| 2014/0216647 A1 | 8/2014 | Yang | |
| 2014/0294226 A1 | 10/2014 | Suvanto | |
| 2016/0041406 A1 | 2/2016 | Ramirez Flores et al. | |

FOREIGN PATENT DOCUMENTS

| | | |
|---|---|---|
| WO | WO 2015052233 A1 | 4/2015 |
| WO | WO 2015148673 A1 | 10/2015 |
| WO | WO 20161473620 A1 | 11/2016 |

OTHER PUBLICATIONS

Carpi et al.; "Bioinspired Tunable Lens with Muscle-Like Electroactive Elastomers;" Advanced Functional Materials; (2011); pp. 4152-4158; vol. 21; <doi: 10.1002/adfm.201101253 >.
Cheng et al.; "Dielectrically Actuated Liquid Lens;" Optics Express; (Jun. 11, 2007); pp. 7140-7145; vol. 15, No. 12; Optical Society of America.
Cheng et al.; "Variable Focus Dielectric Liquid Droplet Lens;" Optics Express; (May 1, 2006); pp. 4101-4106; vol. 14, No. 9; Optical Society of America.
Chiu et al.; "Liquid Lenses and Driving Mechanisms: A Review;" Journal of Adhesion Science and Technology; (May 17, 2012); pp. 1773-1788; vol. 26; <doi: 10.1163/156856111X600514 >.
Jiang et al.; "Microlenses: Properties, Fabrication and Liquid Lenses;" (Feb. 20, 2013); CRC Press; Baca Raton; [Contents].
Krupenkin et al.; "Tunable Liquid Microlens;" Applied Physics Letters; (Jan. 20, 2003); pp. 316-318; vol. 82, No. 3; <doi: 10.1063/1.1536033 >.
Li et al.; "Electrowetting-Driven Variable-Focus Microlens on Flexible Surfaces;" Applied Physics Letters; (Jun. 5, 2012); 4 pages; vol. 100, No. 231105; <doi: 10.1063/1.4726038 >.
Li et al.; "Large-Aperture Switchable Thin Diffractive Lens with Interleaved Electrode Patterns;" Applied Physics Letters; (Oct. 5, 2006); 3 pages; vol. 89, No. 141120; <doi: 10.1063/1.2338646 >.
Niklaus et al.; "Array of Lenses with Individually Tunable Focal-Length Based on Transparent Ion-Implanted EAPs;" In: Electroactive Polymer Actuators and Devices (EAPAD) 2010; Proceedings of Society of Photo-Optical Instrumentation Engineers (SPIE); (2010); 12 pages; vol. 7642; <doi: 10.1117/12.848445 >.
Oku et al.; "High-Speed Liquid Lens with 2 ms Response and 80.3 nm Root-Mean-Square Wavefront Error;" Applied Physics Letters; (Jun. 2, 2009); 3 pages; vol. 94, No. 221108; <doi: 10.1063/1.3143624 >.
Oku et al.; "Variable-Focus Lens with 1-kHz Bandwidth;" Optics Express; (May 17, 2004); pp. 2138-2149; vol. 12, Issue 10; Optical Society of America; <doi: 10.1364/OPEX.12.002138 >.
Ren et al.; "Adaptive Dielectric Liquid Lens;" Optics Express; (Sep. 15, 2008); pp. 14954-14960; vol. 16, No. 19; Optical Society of America.
Ren et al.; "Adaptive Liquid Lens by Changing Aperture;" Journal of Microelectromechanical Systems; (Aug. 2012); pp. 953-958; vol. 21, No. 4; <doi: 10.1109/JMEMS.2012.2194777 >.
Ren et al.; "Tunable Fresnel Lens using Nanoscale Polymer-Dispersed Liquid Crystals;" Applied Physics Letters; (Aug. 25, 2003); pp. 1515-1517; vol. 83, No. 8; <doi: 10.1063/1.1604943 >.
Ren et al.; "Tunable-Focus Flat Liquid Crystal Spherical Lens;" Applied Physics Letters; (Jun. 7, 2004); pp. 4789-4791; vol. 84, No. 23; <doi: 10.1063/1.1760226 >.
Ren et al.; "Tunable-Focus Liquid Lens Controlled using a Servo Motor;" Optics Express; (Sep. 4, 2006); pp. 8031-8036; vol. 14, No. 18; Optical Society of America.
Shian et al.; "High-Speed, Compact, Adaptive Lens Using In-Line Transparent Dielectric Elastomer Actuator Membranes;" In: Electroactive Polymer Actuators and Devices (EAPAD) 2013; Proceedings of Society of Photo-Optical Instrumentation Engineers (SPIE); (2013); 7 pages; vol. 8687; <doi: 10.1117/12.2009848 >.
Shian et al.; "Tunable Lens Using Transparent Dielectric Elastomer Actuators;" Optics Express; (Apr. 2, 2013); pp. 8669-8676; vol. 21, No. 7; Optical Society of America; <doi: 10.1364/OE.21.008669 >.
Wang et al.; Variable-Focus Lens with 30mm Optical Aperture Based on Liquid-Membrane-Liquid Structure; Applied Physics Letters; (Apr. 5, 2013); 4 pages; vol. 102, No. 131111; <doi: 10.1063/1.4800603 >.
Wei et al.; "A Tunable Liquid Lens Driven by a Concentric Annular Electroactive Actuator;" In: 2014 IEEE 27$^{th}$ International Conference on Micro Electro Mechamcal Systems (MEMS); (Jan. 26-30, 2014); pp. 909-912; <doi: 10.1109/MEMSYS.2014.6765789 >.
Xu et al.; "A Novel Adaptive Mechanical-Wetting Lens for Visible and Near Infrared Imaging;" Optics Express; (Jun. 7, 2010); pp. 12430-12435; vol. 18, No. 12; Optical Society of America.
Yang et al.; "Fully Developed Contact Angle Change of a Droplet in Liquid Actuated by Dielectric Force;" Applied Physics Letters; (2012); 4 pages; vol. 101, No. 182903; <doi: 10.1063/1.4759112 >.
Ye et al.; "Liquid Crystal Lens Prepared Utilizing Patterned Molecular Orientations on Cell Walls;" Applied Physics Letters; (Oct. 3, 2006); 3 pages; vol. 89, No. 141112; <doi: 10.1063/1.2358211 >.

(56) References Cited

OTHER PUBLICATIONS

Zhang et al.; "Fluidic Adaptive Lens with High Focal Length Tunability;" Applied Physics Letters; (May 12, 2003); pp. 3171-3172; vol. 82, No. 19; <doi: 10.1063/1.1573337 >.

* cited by examiner

LOW-POWER LARGE APERTURE ADAPTIVE LENSES FOR SMART EYEGLASSES

RELATED APPLICATIONS

This application is a continuation application of U.S. application Ser. No. 16/068,328, filed Jul. 5, 2018, which is a U.S. national stage entry of International Application No. PCT/US2017/012537, filed Jan. 6, 2017, which claims priority to U.S. Provisional Application No. 62/367,594, filed on Jul. 27, 2016, which is incorporated herein by reference, and this application also claims priority to U.S. Provisional Application No. 62/387,854, filed on Jan. 6, 2016, which is incorporated herein by reference.

GOVERNMENT INTEREST

This invention was made with government support under Grant EB023048 awarded by the National Institutes of Health. The government has certain rights in the invention.

BACKGROUND

Deterioration of vision is inevitable to all humans. By the age of forty five, the biological lens in our eyes starts to lose its elasticity thus producing refractive vision errors, and the eye cannot clearly focus the images from the outside world. The result of refractive errors is blurred vision, affecting our ability to focus on near or far objects, which is sometimes so severe that it causes visual impairment. The four most common vision refractive errors are: (1) myopia (nearsightedness): difficulty in seeing distant objects clearly; (2) hyperopia (farsightedness): difficulty in seeing close objects clearly; (3) astigmatism: distorted vision resulting from an irregularly curved cornea, the clear covering of the eyeball, and (4) presbyopia, which leads to difficulty in reading or seeing at arm's length (linked to ageing and occurs almost universally). Refractive errors cannot be prevented, but they can be diagnosed by an eye examination and treated with corrective glasses, contact lenses, or refractive surgery.

In particular, presbyopia is the irreversible loss of the accommodative ability of the eye that occurs due to aging. Accommodation refers to the ability of the eye to increase its refractive power of the crystalline lens in order to focus near objects on the retina. In the first two decades of life accommodative amplitude has been shown to be relatively stable in the range of 7-10 diopters. By the age of fifty, accommodative amplitude has typically decreased to about 0.50 diopters. This decline occurs as a natural result of aging and will ultimately affect any person reaching sufficiently advanced age. Despite its ubiquity, the exact mechanism behind presbyopia remains unknown. Presbyopia is primarily an inevitable, age-related condition and accordingly its prevalence in a given population is related to the percentage of individuals surviving to old age. Worldwide in 2005 over 1 billion people were estimated to suffer from presbyopia alone.

Eyeglasses are the most common inexpensive tools for correction of refractive vision errors. This corrective tool is ancient and it has not been notably improved since the mid-1800s. Conventional eyeglasses have a number of drawbacks; most importantly they cannot fully restore the vision accommodation range of a normal eye. Corrective eyeglasses are ancient devices that originated in Europe's middle ages. Most historians believe that the first form of eyeglasses was produced in Italy by monks or craftsmen around 1285-1289. Reading eyeglasses were shaped like two small magnifying glasses and set into bone, metal, or leather mountings that could be balanced on the bridge of nose. The first known artistic representation of the use of eyeglasses was Tommaso da Modena's painting in 1352. The first eyeglasses could only be used to rectify hyperopia and presbyopia. Eyeglasses for myopia appeared much later, sometime in the early 1400's. Hinged glasses weren't made until the 1750's. A fundamental and major drawback of eyeglasses is that these devices can only correct for the lack of accommodation at a reduced distance range; therefore, one can produce sharp full-field images for objects that are either far or near the observer but not both. This problem has been partially alleviated with the use of bifocal lenses (invented by B. Franklin in 1784), multifocal and progressive lenses, which remedy this problem but at the expense of a reduced, fragmented field of view. In spite of many advances in the materials and fabrication techniques for eyeglasses in the last fifty years, there has been essentially no meaningful progress in the operation and basic limitations of these devices since the early 1900's.

Refractive vision errors that originate from loss or inability of eye accommodation (its ability to change focus) cannot be fully corrected by fixed eyeglasses. In the human eye, the image is produced at the retina which is immersed in vitreous humor, a watery fluid with index of refraction $n_t=1.33$. The lens equation for the human eye imaging system is approximately $$\frac{1}{s_o}+\frac{n_t}{s_i}=\frac{n_t}{f_i}=\frac{1}{f_o} \tag{1}$$

where $s_o$ is the distance between the object and the lens, $s_i$ is the distance between the lens and image, $f_i$ is the image focal distance and $f_o$ is the object medium referred focal distance. A healthy eye automatically adjusts the lens focal length to produce a sharp image at the retina independent of the object distance. In other words, the eye lens object focal distance is adjusted such that $$f_o(s_o, s_i) = \frac{s_o \cdot s_i}{s_i + n_i \cdot s_o} \tag{2}$$

for a fixed $s_i$. The image focal length of the eye with an object at infinity is approximately $(f_i)_{max}=s_i=22$ mm corresponding to an object lens power (the inverse of $(f_o)$max) of +60 diopters. The normal eye can adjust its focal length to see objects between ~10 cm to infinity. Therefore $(f_i)_{min}$~19 mm corresponding to a maximum object lens power of +70 diopters. The normal accommodation range of the human eye is (Delta $P_{eye})_{normal}$=7-10 diopters.

If the eye losses its ability to accommodate its lens focal length, objects in some regions of the 10 cm-infinity range will be projected on the retina out of focus producing refractive errors. Conventional eyeglasses correct these errors by placing a fixed focus lens of power $P_{lens}$ in close proximity of the lens between the object and the lens. For two or more thin lenses close together, the optical power of the combined lenses is approximately equal to the sum of the optical powers of each lens: P=P1+P2. Therefore the net corrective effect is approximately $$\frac{1}{f_o} \approx \frac{1}{(f_o)_{eye}} + P_{lens} \rightarrow f_o = \frac{(f_o)_{eye}}{1 + P_{lens} \cdot (f_o)_{eye}} \quad (3)$$

For presbyopia and hyperopia, 14 mm and the image is projected behind the retina; hence we use a corrective lens with a positive power, $P_{lens} > 0$ to bring the image at the retina back in focus. For myopia, the situation is reversed as 17 mm projecting the image in front of the retina; hence we use a corrective lens with a negative power, $P_{lens} < 0$ for focusing. Note that all that a fixed power corrective lens does is to provide a fixed shift in the effective object lens power of the eye produce the "in focus" focal distance of the equation immediately above. It does not change the accommodating power range of the defective eye.

$$\Delta P_{eye} = \left( \frac{1}{(f_o)_{min}} - \frac{1}{(f_o)_{max}} \right) < (\Delta P_{eye})_{normal} \quad (4)$$

This is the reason why a fixed focus corrective lens can bring objects within a range in focus, but cannot correct the focus for the entire range of normal vision. The modern conventional approach for vision correction over the entire object distance range is based on the utilization of bifocal or multifocal lenses where different regions of the vision field have different focal lengths. For example in bifocal glasses it is common to increase the lens power on the lower half of the visual plane for reading which fails to imaging objects over the entire visual field. In short, it is clear that despite its ancient origins the corrective eyeglass technology has not progressed much in their functionality. Current state of the art eyeglasses do not fully restore vision, while billions of world population inevitably suffer from deteriorating vision.

There is a large amount of literature on the construction of variable focus lenses. One of earliest attempts for variable focus eyeglasses has been the Alvarez lens. The Alvarez lens includes two plano-convex-concave lenses sliding against each other. Each of the curved surfaces contributes a positive or negative power for each interface of the lens. The net power depends on their relative position which can be adjusted to a positive or a negative power with a slider or a screw. Alvarez lenses are commercially available with adjustable powers between −6 to +3 diopters. The Alvarez lens has unfortunately many visually disturbing issues including the presence of a visible gap, and imperfections and friction in the sliding glasses virtually renders them useless for practical situations. An additional problem with these types of lenses is that the field of vision is severely reduced due to the continuously varying lens power.

Variable focus lenses can be implemented using two additional technologies. The most interesting approach is the use of liquid crystals. The index of refraction in liquid crystal materials is a function of their applied electric field. One may therefore implement a lens simply by changing the voltage of a LCD liquid layer trapped between two pieces of glass. Unlike regular shaped-surface lenses, LCD variable focus lenses are flat and are based on graded index lenses (or GRIN lenses) which are commonly used in the fiber optics industry. The change in the delay phase with radius is formed by the resulting electric fields produced by a specific transparent electrode (ITO) shape. The aberration distortions produced by LCD glasses are small, and Sato developed a lens arrangement that produces focusing for a wide range of light polarizations. In principle, LCD is very attractive for this application because it takes very little electrical power to change the phase of the light through the LCD material. This implementation method indeed works well for lenses a few mm in diameter used in single wavelength light. In the eyeglass application, however, the aperture is large. Since the LCD power is $$P = \frac{\lambda \Delta \varphi}{\pi \cdot r^2} = \frac{2 \cdot t \cdot \Delta n}{r^2} \quad (5)$$

where r is the lens aperture radius, $\lambda$ is the light wavelength, $\Delta \varphi$ is the change in phase, $\Delta n$ is the change in index and t is the LCD thickness. Because of the quadratic radius dependence it is difficult to make a high power large aperture LCD lenses. A proposed method to avoid excessively large LCD thicknesses is the use of Fresnel configurations. Unfortunately, Fresnel lenses do not have sufficient image quality for practical ophthalmic applications.

Variable focus lenses of large aperture can also be implemented using fluidic, flexible lenses. A variable focus liquid lens includes a cylindrical bladder with flexible membrane walls which is filled with a transparent optical fluid. The shape of the lens is changed by pumping fluid in and out of the lens or by squeezing the fluid lens. Some commercially available examples have manually adjusted liquid filled eyeglass capable of adjusting the lens power between −6 to +3 diopters. A major issue with liquid squeezable lenses is the actuation mechanism size and weight. Several actuation approaches have been tried with various degrees of success, including the use of external motors, electrostatic forces, electrophoretic motion, and more recently piezoelectrics. The largest aperture commercially available continuously adjustable variable-focus liquid lens is manufactured by Optotune with a clear aperture of 20 mm, and the largest electrically tunable liquid lens has aperture of 10 mm. However, none of these lenses has sufficient aperture for commercially useful eyeglasses. Larger aperture fluidic systems have been realized, but they are not practical for lightweight applications without careful consideration of the storage of the lens liquid. The realization of a lightweight adjustable focus lens that works well for eyeglasses is still an unsolved problem.

SUMMARY

A variable focus optical device comprises a first optically transparent membrane and a second membrane defining a chamber. An optically transparent liquid is disposed in the chamber. A transparent piston is positioned adjacent and attached to the second optically transparent membrane. At least one actuator is operatively coupled to the transparent piston and configured, upon activation, to move the transparent piston thereby deforming the first and second membranes to change a focal length of the variable focus optical device.

Although other actuators may be used, in one example, the at least one actuator can be three curved bimorph piezoelectric actuators that surround the transparent piston and couple the piston to a frame supporting the first and second membranes. The transparent piston, first optically transparent membrane, and the second membrane can each have substantially the same central axis. The actuators can function with an electrical power dissipation of approximately 10 to 20 mW or lower depending on the driving mode (static piezo lenses consume nearly zero power), thereby providing a very low-power lens actuator relative to a size of the lens aperture being at least 10 mm, preferably at least 30 mm.

An eyeglasses system designed for ophthalmic applications comprises a pair of lenses coupled to a frame, and each lens comprises a transparent piston membrane and at least one actuator operable to move the transparent piston membrane. An object distance sensor is coupled to the frame and configured to measure a distance from the proximate the lenses to an object. Optionally, at least one eye tracking sensor can be coupled to the frame and configured to measure at least one eye position of a wearer. A microcontroller can also be coupled to the frame and configured to facilitate actuating the at least one actuator to move the transparent piston membrane of each lens to adjust a focal length of each lens as corresponding to the measured distance of the object and to the at least one eye position of the wearer. The object distance sensor can comprise an infrared proximity sensor configured as a time-of-flight measurement device, and the at least one eye tracking sensor can comprise an infrared light source and a video camera configured to measure eye position and eye movement.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
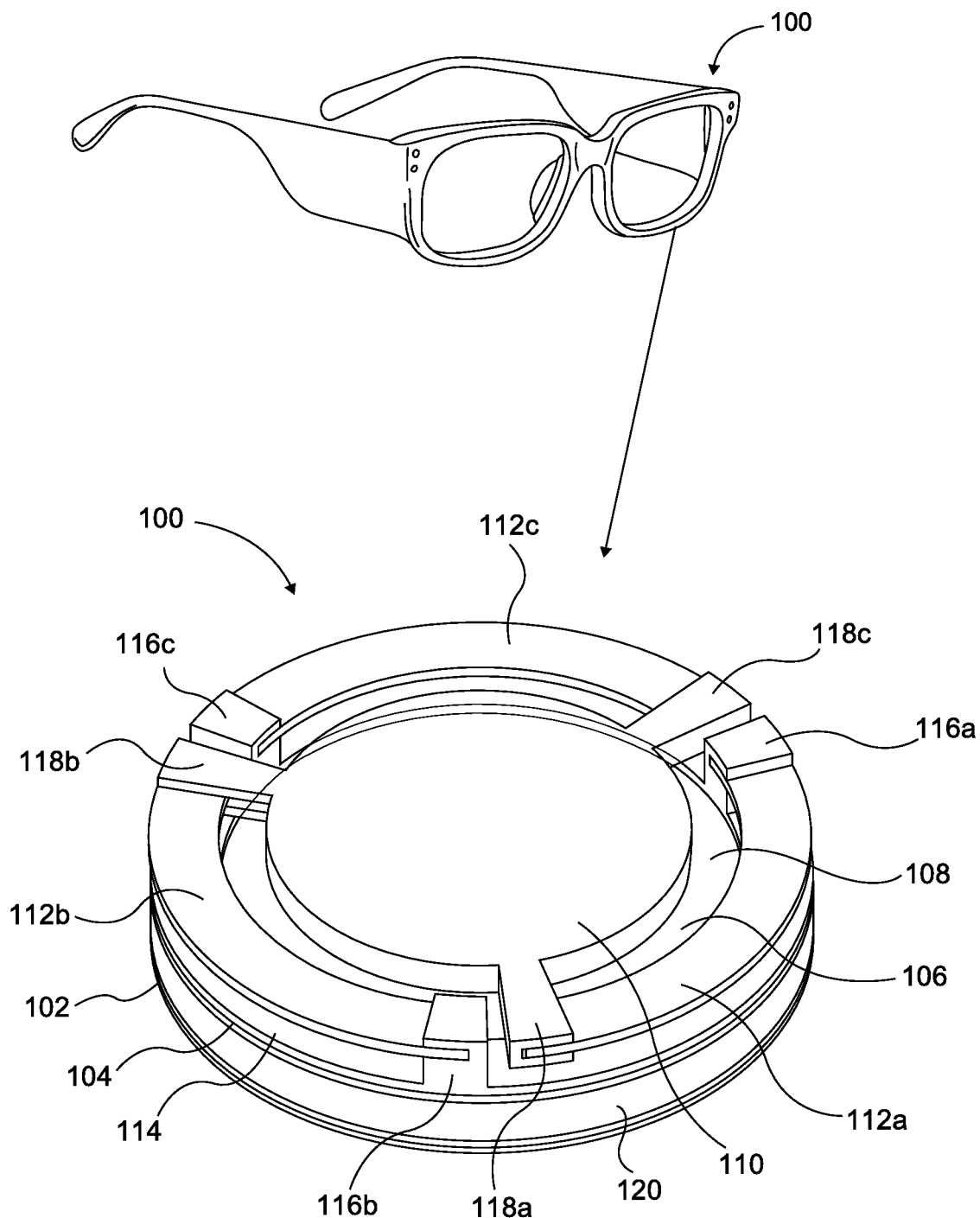
FIG. 1 is a schematic model of a variable focus optical device in accordance with an example of the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a bimorph" includes reference to one or more of such features and reference to "inducing" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Low-Power Large Aperture Adaptive Lenses for Smart Eyeglasses

In order to resolve the issues in current state-of-art eyeglasses, the present disclosure pertains to a new adaptive smart eyeglass that restores the full visual range. A component to the disclosed smart glasses system is a set of variable focus, large aperture lenses. In order to accommodate the needs of most eyeglass-corrected problems, the power of the lens can have an accommodation ranging from −4 to +4 diopters. Furthermore, most eyeglass lenses are light, thin, and have aperture of 10-45 mm in diameter. Using the system herein, such variable lens power range and aperture range can be accommodated at a minimum electrical power expense.

FIG. 1 illustrates a variable focus optical device 100 in accordance with an example of the present disclosure. The variable focus optical device 100 can be incorporated as a lens of a pair of eyeglasses, as shown and discussed regarding FIG. 4 in one example. The variable focus optical device 100 can comprise a first optically transparent membrane 102 and a second optically transparent membrane 104 defining a chamber 106 (see also the discussion of FIG. 3A-3C). The optically transparent membranes can be formed of any suitable flexible transparent material. Typically a polydimethylsiloxane (PDMS) polymer can be used, although non-limiting examples can include elastomers, fluoroelastomers, saturated and non-saturated rubbers, silicone rubbers and other thin flexible polymers such as Teflon, polyethylene. If the membrane is sufficiently thin its deflection can be made completely tension dominated and independent of the mechanical properties of the membrane film. The optically transparent membranes can generally have a thickness ranging from about 0.01 mm to about 2.0 mm and often from about 0.08 mm to about 0.4 mm, although thicknesses can vary considerably depending on material strength. An optically transparent liquid 108 may be disposed in the chamber 106, thereby defining a closed fluidic lens system, for instance. Typically, the chamber can be enclosed so as to form a closed fluid system without inlets or outlets such that during focusing the fluid volume in the chamber remains constant. During manufacture, an inlet may be provided to initially introduce fluid which is then capped or plugged once filled. The optically transparent liquid 108 can be glycerine, or glycerol having a density of 1.26 g cm$^{-3}$ where n=1.47, for instance. Other suitable transparent liquids can include, but are not limited to, high index optical fluids such as SANTOLIGHT 5267 (n=1.67) liquid crystals, ferroelectric liquids, other high index oils, and the like. The chamber 106 can be defined by a circumferential wall 120 disposed about a perimeter of the chamber 106 to contain the optically transparent liquid 108. The wall 120 can be part of a frame of eyeglasses, for instance, or can be a separate wall such that a complete lens unit can be inserted into a corresponding eyeglass frame. A transparent piston 110 may be positioned adjacent and often in direct contact with the second optically transparent membrane 104. The transparent piston 110 can be formed of any suitable transparent material having sufficient rigidity to deflect the second membrane 104. Non-limiting examples of suitable material for the transparent piston can include glass, polycarbonate, acrylics, sapphire, transparent ceramics, and the like. As a general rule, the transparent piston can have any thickness as long as it provides sufficient stiffness. If the piston thickness is made too thin, the piston will deform also causing a lensing effect. Generally, the piston thickness can be minimized for reduced weight and can typically range from about 0.2 mm to about 3 mm, depending on the lens size, power range, and material strength. In one aspect, the transparent piston 110 can be bonded to the second membrane 104 by a clear urethane liquid rubber so that it moves collectively with the piston 110 when actuated. In one example, the second membrane 104 spans the lens opening as a uniform continuous layer. Alternatively, the second membrane 104 can be formed having the transparent piston 110 oriented within an aperture of the membrane. In such a case the second membrane 104 can be secured to edges of the transparent piston. Further, in such cases the second membrane may be transparent or can be opaque since the second membrane would be present outside an outer perimeter edge of the transparent piston 110. The second membrane may be secured via crimping, gluing, or any suitable fastening mechanism. When the second membrane 104 is secured to a perimeter of the transparent piston 110, the second membrane defines a portion of the chamber, while the transparent piston defines a remaining portion of the chamber to form an enclosed chamber.

Figure 3A:
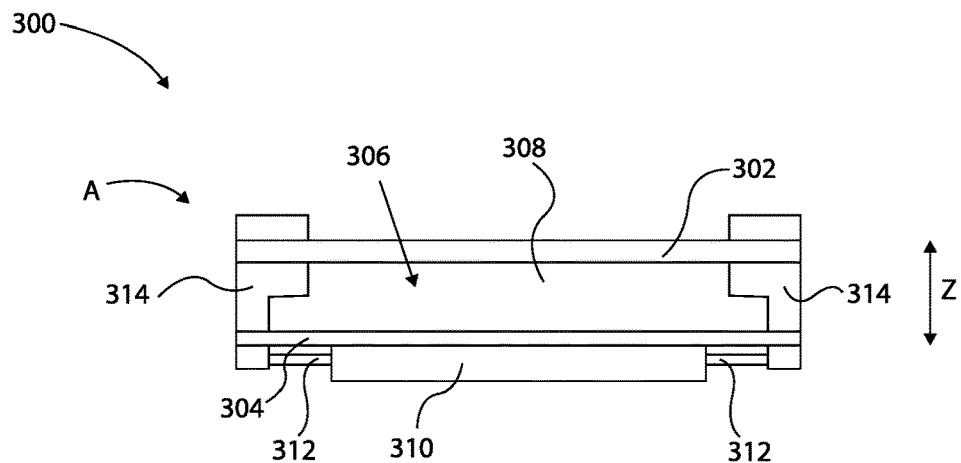
FIG. 3A is a schematic cross sectional view of a variable focus optical device in accordance with an example of the present disclosure.
Figure 3B:
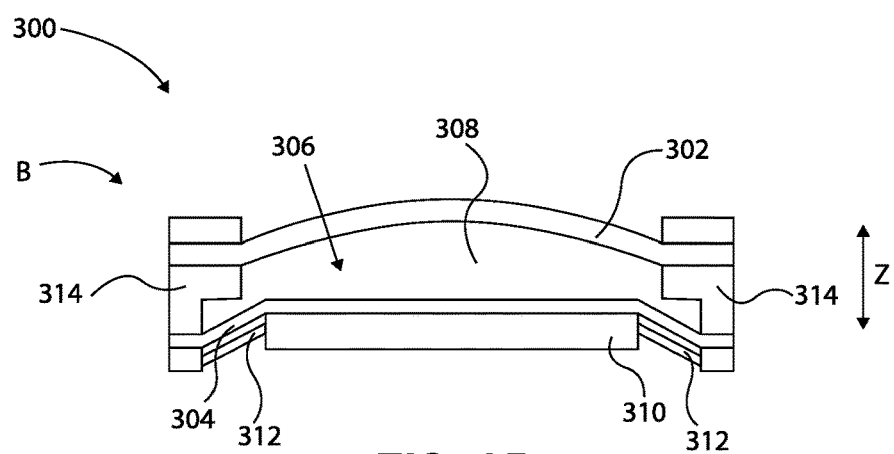
FIG. 3B is the variable focus optical device of FIG. 3A in a convex configuration in accordance with an example of the present disclosure.
Figure 3C:
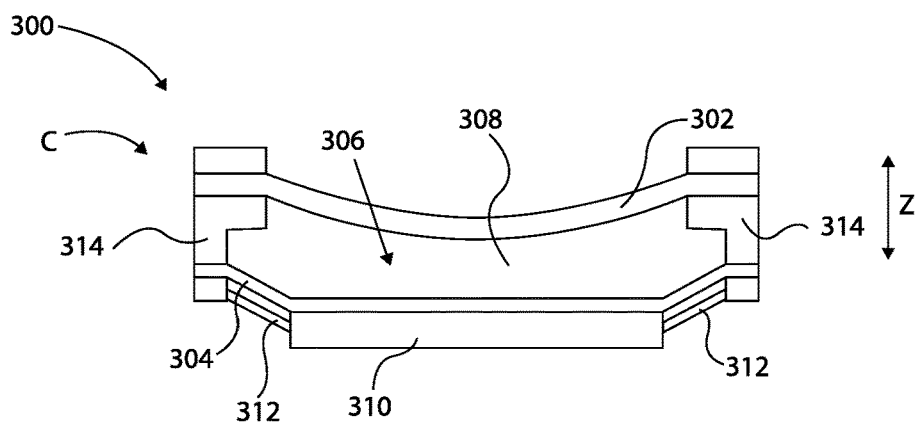
FIG. 3C is the variable focus optical device of FIG. 3A in a concave configuration in accordance with an example of the present disclosure.

Regardless, a plurality of actuators 112a-c may be operatively coupled to the transparent piston 104 and configured, upon activation by an applied voltage, to move the transparent piston 104 (in a z direction; e.g., FIGS. 3B and 3C). Thus, the first and second optically transparent membranes 102 and 104 can be caused to deform to change a focal length of the variable focus optical device by changing a relative distance between the first and second optically transparent membranes 102 and 104 and curvature of the first optically transparent membrane 102.

In one specific example, the plurality of actuators 112a-c can be three curved bimorph piezoelectric actuators that collectively surround the transparent piston 110. Although three such actuators are illustrated, any functional number of such actuators may be used (e.g. two to about six, and most often three to four). For example, a higher number of actuators may limit the power accommodation range (e.g. piston movement distance). The bimorph piezoelectric actuators can be formed by layering a passive layer between two piezoelectric layers or by bonding two layers of different polarization. Non-limiting examples of suitable piezoelectric materials can include PZT, PZT-5A, PZT-5H, PMNPT, PIN-PMN-PT.

A frame 114 (such as a frame of eyeglasses or a cylindrical wall) may support the first and second membranes 102 and 104. Dow Corning's "734 Flowable Sealant" can be used to seal the membranes 102 and 104 to the frame 114, for instance. Other suitable sealants can include, but are not limited to, elastomer-plastic, elastomer-glass sealants, and elastomer-metal sealants The frame 114 can be one or more structural support components that structurally support each membrane 102 and 104 and the transparent piston 110. In any event, the frame 114 supports annular perimeter portions of each of the first and second membranes 102 and 104, thereby spatially separating them from each other about the optically transparent liquid 108.

The actuators 112*a-c* can be operatively coupled between the frame 114 and the transparent piston 110. Specifically, each actuator 112*a-c* can be attached at one end ("fixed end") to a frame support portion 116*a-c*, respectively, and attached at the other end ("free end") to a piston connecting portion 118*a-c*, respectively. In this manner, each actuator extends circumferentially about a portion of a perimeter of the transparent piston. Each piston connecting portion 118*a-c* can be a flange that extends outwardly from a center of the transparent piston 110, and each flange can be attached to the free end of each actuator 112*a-c*. Each frame support portion 116*a-c* is raised above or protrudes from the frame 114. Each frame support portion 116*a-c* can have a slot or other interfacing/coupling member to fixedly attach to the fixed end of each actuator 112*a-c*. Either or both of the piston connecting portions 118*a-c* and frame support portions 116*a-c* can be integrally formed as part of the piston or frame, respectively, or can be attached thereto. This configuration effectively provides a piezoelectric cantilever arrangement where each actuator 112*a-c* is spatially positioned away from the frame 114 so that each actuator 112*a-c* can bend or actuate relative to the frame 114 to move the transparent piston 110 in either direction along the z axis (e.g., see FIGS. 3A-3C), which thereby can change a focal length of the variable focus optical device 100.

Alternatively, pivoting pins can be coupled between the free ends of each actuator 112*a-c* and respective piston connecting portions 118*a-c* to more freely allow flexure of the each actuator 112*a-c* when actuated (thereby reducing or eliminating a bending moment of the actuated piston 110 and corresponding piston connecting portions 118*a-c*). For example, nickel plated steel pins can be soldered on the free end of each actuator 112*a-c*. The connecting portions 118*a-c* can each have a horizontal hole to receive a respective pin of a respective actuator. This pin and hole configuration provides a pivoting end for each actuator, which can overcome twist-induced stiffening of the curved actuators, thus providing improved vertical deflection of the piston 110 without compromising force.

In one example, each actuator 112*a-c* is curved about a perimeter of the transparent piston 110 and congruent with a perimeter portion of the frame 114. Consequently, the actuators are curved or surround the perimeters of the first and second transparent membranes 102 and 104, and do not obstruct the transparency of the membranes 102 and 104 or the piston 110.

Figure 2A:
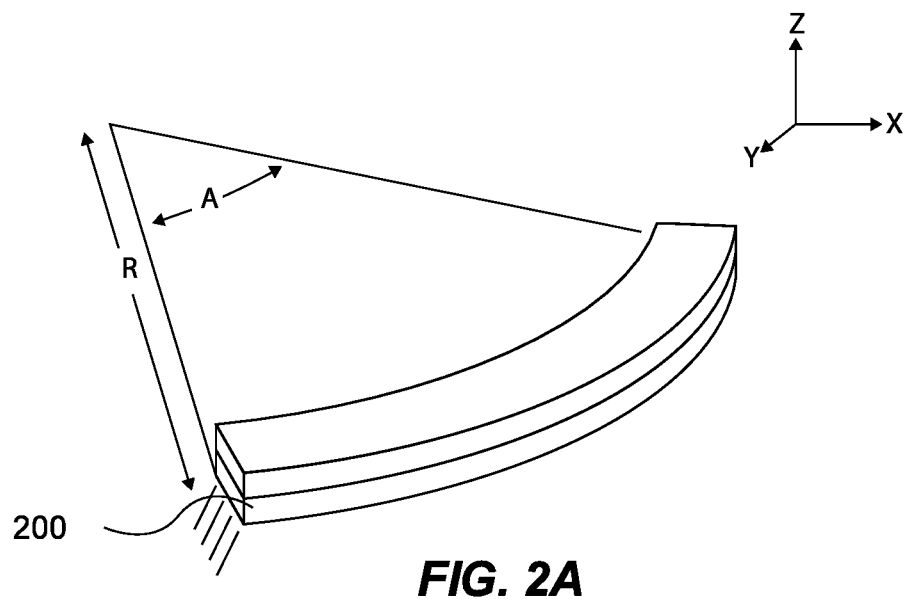
FIG. 2A is an illustration of a curved bimorph of the variable focus optical device of FIG. 1 in accordance with an example of the present disclosure.
Figure 2B:
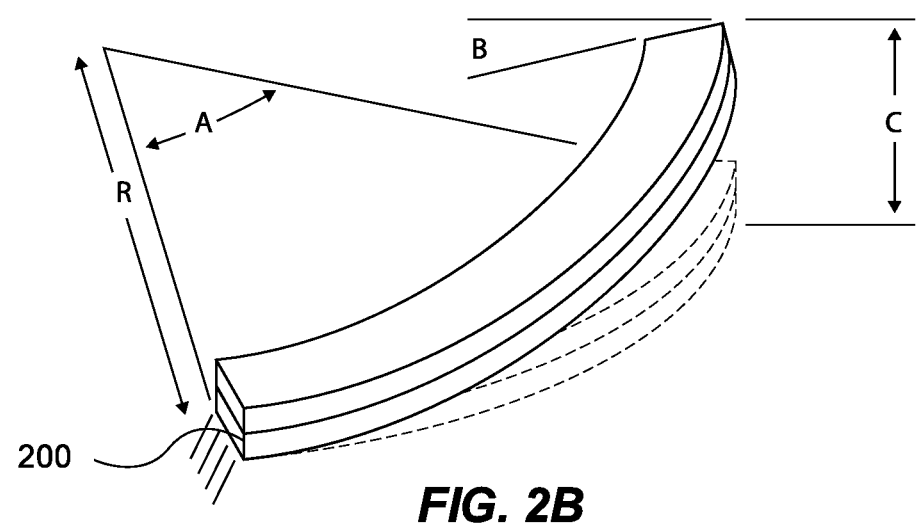
FIG. 2B is an illustration of deflection of the curved bimorph of FIG. 2A in accordance with an example of the present disclosure.

This curved bimorph deformation principle is further illustrated in FIG. 2A (un-deformed) and in FIG. 2B (deformed). The curved bimorph actuator 200 consists of two thin-film layers, such as different piezoelectric materials, as known in the industry. A passive layer can also be disposed between the two active piezoelectric layers. The difference in strains produced in the two active layers causes the bimorph to curl due to the differential voltage between the two layers (when a voltage is applied), thereby leading to actuation (i.e., one layer contracts while the other expands). In one specific example, actuator sheets provided by Piezo System, Inc. can be used (part number CT223-H4CL-503X) and cut into curved shapes by using diamond rotary saw followed by grinding. However, such bimorph piezoelectric elements can be commercially obtained or directly formed.

Deflection of straight bimorphs, on the other hand, is linearly proportional to the applied drive voltage and quadratically proportional to the bimorph length. The theory of straight bimorphs and multimorphs is generally known. Straight bimorphs undergo bending upon actuation in a y direction. The tip deflection z of a bimorph of length L with an external applied opposing force F is $$z = \frac{L^2}{6 \cdot E \cdot I} \cdot (3 \cdot M_p - 2 \cdot F \cdot L) \tag{6}$$

where E and I are the Young modulus and moment of inertia, respectively and $M_p$ is the piezoelectric moment $$M_p = w \cdot I \cdot d_{31} \cdot t_p \cdot V \tag{7}$$

where w is the beam width, $t_p$ is the thickness of each bimorph layer (generally half the bimorph thickness), $d_{31}$ is the piezoelectric coefficient and V is the applied voltage.

Curved bimorphs are different from the straight bimorphs because as they bend they also rotate, as shown on FIG. 2B. The rotation is caused by the difference in the curved bimorph length at the outer and inner radius, which results in a larger deflection on the outer radius. The vertical and angular deflection have been calculated in $$U(r, s) = \frac{M_b \cdot R^2}{E_b \cdot I_b} \cdot \left(1 - \cos\left(\frac{s}{R}\right)\right), \varphi(s) = \frac{U(s)}{R}, \tag{8}$$

where U (s) is the vertical deflection at the mid radius R as a function of the length along the mid radius, and $\varphi(s)$ is the angle B, as shown in FIG. 2B. The parameters, $E_b$ and $I_b$ are the bimorph's Young's modulus and moment of inertia, respectively and $M_b$ is the bimorph's piezoelectric moment, $$M_b = w_b \cdot E_b \cdot d_{31} \cdot t_b \cdot V_b, \tag{9}$$

where, $w_b$ is the bimorph's beam width, $t_b$ is the thickness of each bimorph layer, $d_{31}$ is the bimorph piezoelectric coefficient, and $V_b$ is the bimorph's applied voltage.

Note that for efficient deflection, the free end of the bimorph must pivot about the highest elevation point at the end of the outer radius. As mentioned above, curved bimorphs bend and rotate when actuated, as illustrated comparing FIGS. 2A and 2B. For example, a 22.5 mm radius (R) (i.e., center radius) actuator being 5 mm wide (W) and has an angle of 115 degrees (A), and upon applying a 10-20 mW voltage, then a 1 mm deflection (C) yields a rotation angle (B) of 2.5 degrees. Thus, the difference in deflection is approximately 20 percent between the inner and outer radius of the curved bimorph actuator 200. In the examples of FIGS. 1 and 3A-3C, the three curved bimorph actuators can vertically displace about 1 mm (in either z direction) under a 50 gram load. This is the deflection force that can be required to move a 30-40 mm aperture lens using 20 mW (or less) of power, for example. The actuators 112*a-c* can each have a mechanical resonance of about 65-70 Hz, which is relatively fast compared to other lens actuation systems. Such resonance corresponds to focus response times from about 1 msec to about 5 seconds and in some cases from 15 msec to 100 msec, depending on specific configuration and materials used. The above example is illustrated on FIGS. 3A-3C, as further discussed below.

In one example, a curved bimorph can have the following characteristics:

TABLE 1

| Bimorph Material | PZT 5H4E |
|---|---|
| Layer Thickness, $t_p$ | 270 μm |
| Width, w | 8.5 mm |
| Young's Modulus, E | $5 \times 10^{10}$ N/m$^2$ |
| Piezoelectric Strain Coefficient, $d_{31}$ | $-320 \times 10^{-12}$ m/V |
| Radius of Curvature, R | 21.75 mm |
| Angle of Cosine, (s/R) | 110° |
| Voltage Range | 0-250 V |

Thus, the bimorph actuators can require multiple high voltage control signals. For evaluation and testing purposes, a fixed 300V DC voltage source can be converted to variable voltages using high-voltage pulse width modulators (PWMs). This high voltage DC can also be generated using miniature 3V DC-to-DC converters suitable for battery driven setups. In one example, each PWM modulator can be implemented using a high voltage half-bridge driver circuit (ST Micro L6384E) and two high voltage NMOS transistors (ST Micro IRF820) and a high-voltage 100 nF capacitor. The half-bridge drivers can be driven by a microcontroller through opto-isolators. The bimorph actuators can be driven in a two-terminal series configuration using two PWM high-voltage circuits in differential drive configuration. A software open loop control system can be used to control the bimorph deflection and the lens optical power. The bimorph actuator bending magnitude and direction can also be changed by adjusting the duty cycle of the PWM signal and driving from only one of the opposing PWM drivers. In addition to series bimorph actuators, other more efficient three-terminal configurations are also possible, such as Y-poled (polling direction same) three-wire bimorphs for actuation in a bipolar configuration. The bipolar configuration can provide 30% more deflection with higher actuation force but can also require higher voltages, sometimes as large as double the voltage required in the series configuration.

FIGS. 3A-3C provides a cross sectional schematic views of a variable focus optical device 300, such as the device 100 of FIG. 1, according to an example of the present disclosure. Similarly, the variable focus optical device 300 may include a first optically transparent membrane 302 and a second optically transparent membrane 304 defining a chamber 306. An optically transparent liquid 308 may be disposed in the chamber 306, thereby defining a closed fluidic system. A transparent piston 310 may be positioned adjacent and attached to the second optically transparent membrane 304, such as in the arrangement shown and described regarding piston 110 of FIG. 1. The transparent piston 310 can be adhered to the second membrane 304 along the outer surface of the second membrane 304. A frame 314 supports the first and second membranes 302 and 304. The frame can be a frame of eyeglasses or a circumferential wall. The frame 314 can be comprised of a uniform rigid body supporting perimeter portions of the first and second membranes 302 and 304, or the frame 314 can be a plurality of rigid components coupled to each other. In one aspect, the transparent piston 310 and the first and second membranes 302 and 304 each have substantially the same central axis along the z direction. The frame 314 can have a height of approximately 2.5 mm, an inner radius of approximately 18 mm, and an outer radius of approximately 22 mm, in one example. However, as a general guideline, the height may range from 0.5 to 10 mm, the inner radius from 10 to 35 mm, and the outer radius from 12 to 40 mm.

As shown on each of FIGS. 3B and 3C, upon actuation of at least one actuator 312 (or three actuators, as in FIG. 1), the piston 310 moves such that a collective shape of the first and second optically transparent membranes 302 and 304 increases or decreases to produce either a plano-convex or a plano-concave shape, respectively. Specifically, configuration A of FIG. 3A shows the variable focus optical device 300 in an un-deflected nominal shape, and configuration B of FIG. 3B shows the variable focus optical device 300 in a plano-convex shape, and configuration C of FIG. 3C shows the variable focus optical device 300 in a plano-concave shape. Thus, with regard to FIG. 3B, applying a positive voltage (e.g., of 10-20 mW) to the at least one actuator 312 causes the actuator (being one or more curved piezoelectric bimorphs) to deflect and bend in a first direction (z direction), thereby causing the attached piston 310 to move toward and bias the second membrane 304. Such movement causes the second membrane 304 to deflect (relative to the frame 314), which causes fluidic pressure of the optically transparent liquid 308 in the chamber 306 in a pushing manner. Such pressure of the optically transparent liquid 308 in the z direction causes deflection of the first membrane 302, thereby generating a plano-convex shape configuration B. This can cause a positive change in lens power over a 5-8 Diopter range, for a 32 mm diameter aperture.

Inversely, with regard to FIG. 3C, applying a negative voltage (e.g., 10-20 mW) causes the actuator 312 (e.g., one or more curved piezoelectric bimorphs) to deflect and bend in a second direction (z direction) opposite the first direction, thereby causing the attached piston 310 to move away from and "pull" the attached second membrane 304. Such movement causes the second membrane 304 to deflect (relative to the frame 314), which causes fluidic pressure of the optically transparent liquid 308 in the chamber 306 in a pulling manner. Such displacement of the optically transparent liquid 308 in the (opposite) z direction causes deflection of the first membrane 302, thereby generating a plano-concave shape configuration C. This can cause a negative change in lens power over a 5-8 Diopter range for a 32 mm diameter lens.

The total force required to change the lens power (e.g., a variable focus lens device) is the sum of the force required to deflect the first membrane 302 and the second membrane 304 with the piston 310, for instance. Thus, the first membrane 302 has a thickness $t_t$ and radius $r_i$ and the second membrane 304 has a thickness and radius $t_b$ and $r_b$. The second membrane 304 radius is larger than that of the first membrane 302. The second membrane 304 is forced flat at the center using the piston 310 of radius $r_p$. When a force is applied to the second membrane 304, the shape of the liquid lens will increase or decrease to produce either a plano-convex of a plano-convex lens obeying equation (10).

$$P = \frac{1}{f} = (n-1)\left[\frac{1}{R_1} - \frac{1}{R_2} + \frac{(n-1)d}{nR_1R_2}\right] = \frac{(n-1)}{R} \quad (10)$$

Thus, the force required for the first membrane 302 ($F_{top}$) and the second membrane 304 ($F_{bot}$) is $$F_{top} = \left(\frac{16\pi \cdot E_1 t_t^3}{3 \cdot r_t^2(1-v^2)}\right) \cdot \delta_t \quad (11)$$

-continued $$F_{bot} = \left( \frac{16\pi \cdot E_b t_b^3}{3 \cdot r_b^2 (1-v^2)\left[1 - \left(\frac{r_p^4}{r_b^4}\right) - 4 \cdot \left(\frac{r_p^2}{r_b^2}\right) \cdot \ln\left(\frac{r_b}{r_p}\right)\right]} \right) \cdot \delta_b$$

where $E_t$ and $E_b$ are the Young's moduli of the first and second membranes 302 and 304, respectively, and $\delta_t$ and $\delta_b$ are the corresponding peak deflections. Because the piston 310 is flat, the power of the lens is give by equation (10), and the deflections of the first and second membranes 302 and 304 are connected as the total liquid volume is constant.

$$V_t = \frac{\pi}{2} \cdot r_t^2 \cdot \delta_t \cdot \left(1 - \frac{\delta_t^2}{3 \cdot r_t^2}\right) + \pi \cdot r_t^2 \cdot h_t + \pi \cdot r_b^2 \cdot h_b + \pi \cdot r_p^2 \cdot \delta_b \cdot \left(1 + \frac{(r_b - r_p)(r_b + 2r_p)}{3 \cdot r_b^2}\right) \quad (16)$$

but also at zero deflection $$V_t = \pi \cdot r_t^2 \cdot h_t + \pi \cdot r_b^2 \cdot h_b \quad (17)$$

Therefore and $\delta_t$ and $\delta_b$ are approximately linearly related $$\delta_t \approx -2 \cdot \frac{r_p^2}{r_t^2} \cdot \delta_b \cdot \left(1 + \frac{(r_b - r_p)(r_b + 2r_p)}{3 \cdot r_b^2}\right) \quad (18)$$

and the radius of curvature of the lens is $$R \approx \frac{r_t^2}{2 \cdot \delta_t} \quad (19)$$

Therefore the lens power is $$P \approx \frac{4 \cdot r_p^2 \cdot \delta_b}{r_t^4} \cdot \left(1 + \frac{(r_b - r_p)(r_b + 2r_p)}{3 \cdot r_b^2}\right)(n-1) \quad (20)$$

Such force is linearly proportional to the piston deflection $\delta_b$ and the piston force $F_{bot}$. Now a calculation can be made for the force required to obtain a power change of +4 diopters.

In one example, the first and second membranes 302 and 304 (e.g., being polydimethylsiloxane (PDMS) membranes) where $E_t=E_b=1$ MPa, the first membrane 302 thickness can be approximately 0.8 mm and the second membrane 304 thickness can be approximately 0.3 mm (or even 0.15 mm). An aperture radius can be approximately 18 mm, and a piston 310 radius can be approximately 17 mm with a thickness of approximately 4 mm. The second membrane 304 radius can be approximately 20 mm. Therefore, the calculation results in a required piston displacement of approximately 0.64 mm and a piston force of approximately 0.12 N (or equivalent to a weight of 12 grams). An additional 4.6 grams are required to produce a maximum deflection of the lens surface on the first membrane 302 of $\delta_t=1.3$ mm, thus the total actuator force is 16.6 grams.

In one example, glycerol is used as the optically transparent liquid because it has both high refractive index (n=1.47) and does not swell PDMS membranes (e.g., the first and second membranes 302 and 304). For a liquid lens filled with glycerol, with density of 1.26 g cm$^{-3}$, a lens with vertical height of 36 mm can produce a maximum hydrostatic pressure difference of $P_{hyd}=g \cdot \rho_g \cdot h=444.5$ Pa between inside and outside the fluidic chamber. Therefore, if glycerol is inserted into the chamber at atmospheric conditions, the first membrane 302 can bulge significantly outward, which makes the initial lens optical power high. The hydrostatic pressure drop deflection is significantly reduced if the lens reservoir is pressure equilibrated and hermetically sealed. Pressure equilibration is achieved when the lens cavity/chamber is filled in by bath immersion, in this case in a mixture of 3:2 glycerol and water, such that at any given point pressure inside and outside the lens are almost equal thus producing little deformation of the membranes 302 and 304 during the fill operation. To obviate these issues, two holes can be drilled on the annular sealing rim (e.g. frame wall) for insertion of the optical lens fluid and venting of air. The two holes can be hermetically sealed while the lens is submerged. The lens is next pulled out of the glycerin bath, rinsed and dried. The hermetic seal produces a vacuum head pressure that counteracts fluid motion driven by gravity producing a much smaller lens deformation. After sealing of the lens chamber, a 1 mm thick acrylic washer can be attached to the front side of the lens (e.g., adjacent the first membrane 302). A second 0.5 mm thick washer can be attached to the back side (e.g., adjacent the second membrane 304) with raised supports for the bimorph actuators.

In one example, the lens (e.g., variable focus optical device) consists of a rigid annular sealing rim (e.g., frame 314) of thickness, γ encapsulated by the first and second membranes 302 and 304 forming the sealed chamber 306. The first membrane 302 has uniform thickness, $t_t$ and radius, $r_t$. The second membrane 304 has a rigid flat central piston 310 of radius, $r_p$ supported by a flexible annular membrane of thickness, $t_b$ and radius, $r_b$. The thickness of the second membrane 304 is made very thin (0.15-0.3 mm) such that the force required to flex it is negligible compared to that required to deform the first membrane 302. When a force is applied to the piston 310, the shape of the first membrane 302 changes bulging out or in depending on the direction of the force, as further discussed above. The radius of the entire variable focus optical device 300 is defined by the frame 314 and the lens thickness is defined by the piston displacement required for a given optical power change. The deflection requirement depends on the shape of the first membrane 302.

The first membrane 302 deflection, $u_o$ for a circular membrane of constant thickness under radial tension T and uniform pressure $q_o$ satisfies the modified biharmonic equation, $$D \cdot \Lambda^4 u_o - T \cdot \Lambda^2 u_o = q_o. \quad (17)$$

Here, D is the flexural rigidity of the first membrane 304. The equations of D and T are, $$D = \frac{E \cdot t_t^3}{12(1-\mu^2)}, \quad T = \varepsilon_i \cdot E \cdot t_t, \quad (18)$$

where $\varepsilon_i$ is the initial membrane stretch, E is the membrane Young modulus, and μ is the membrane Poisson's ratio. The solution of equation (1) for any T and D for a circular diaphragm with clamped edge boundary conditions is well known:

$$u_o = \frac{q_o \cdot r_t^2}{4 \cdot T}\left[(1-\rho^2) + \frac{2}{\beta \cdot I_1(\beta)}(I_o(\beta \rho) - I_o(\beta))\right], \quad (19)$$

where $I_0(\ )$ and $I_1(\ )$ are the zero and first order modified Bessel functions of the first kind, $$\beta = r_t \cdot \sqrt{\frac{T}{D}}$$

is the normalized ratio of tension over rigidity, and $$\rho = \frac{r}{r_t}$$

is the normalized diaphragm radius. This solution has two well-known limits for tension and rigidity dominated regimes. The maximum deflection height, h at the membrane center (r=0) is $$h = u_o(0) = \frac{q_o \cdot r_t^2}{4 \cdot T} \left[ 1 + \frac{2(1 - I_o(\beta))}{\beta} \right]. \quad (20)$$

Note that, if tension is very large ($\beta \gg 1$), equation (4) converges to, $$h = \frac{q_o \cdot r_t^2}{4T}.$$

In order to form a liquid lens, a spherical surface of radius of curvature R is desired. Though, the deformed membrane is not fully spherical, one must approximate the deflection as a quadratic in p corresponding to a spherical cap of radius R and maximum height h, where $$(R-h)^2 + r_t^2 = R^2. \quad (21)$$

For typical lenses used for eyewear $h \ll r_t$, hence $R = r_t^2/2h$. Thus the lens optical power is, $$P_{opt}(q_o) = \frac{(n-1)}{R} \approx \frac{2h(n-1)}{r_t^2} = \frac{q_o}{2 \cdot T}(n-1)\left[1 + \frac{2(1-I_o(\beta))}{\beta I_1(\beta)}\right]. \quad (22)$$

The lens power is thus proportional to the pressure, $q_o$. The first membrane 302 displaced volume is the volume of the spherical cap, $$\Delta V_{front}(q_o) = \frac{1}{6}\pi h(3r_t^2 + h^2) \approx \frac{1}{2}\pi h r_t^2. \quad (23)$$

Since the chamber volume is fixed the same liquid volume is displaced by the second membrane 304. If the second membrane 304 is thin and narrow (e.g., 0.3 mm) and of negligible rigidity, $$\Delta V_{back}(q_o) \approx \frac{1}{2}\pi d_p(r_b^2 + r_p^2) = \quad (24)$$

$$\Delta V_{front}(q_o) \approx \frac{1}{2}\pi h r_t^2 \Rightarrow h \approx \frac{(r_b^2 + r_p^2)}{r_t^2} d_p,$$

where $d_p$ is the piston displacement. The piston force is, $F = \pi r_b^2 q_o$. Combining equation (6) and equation (8), one obtains expressions for the piston spring constant $k_p$, $$k_p = \frac{F}{d_p} \approx 4\pi T \cdot \frac{r_b^2(r_b^2 + r_p^2)}{r_t^4} \cdot \frac{1}{\left[1 + \frac{2(1-I_o(\beta))}{\beta I_1(\beta)}\right]}. \quad (25)$$

Thus the optical power versus piston displacement, $$P_{opt}(d_p) \approx 2(n-1)\frac{(r_b^2 + r_p^2)}{r_t^4} d_p. \quad (26)$$

At the default lens position, the two membranes 302 and 304 are flat and the minimum rim gap is selected such that the membranes are not in contact for the largest piston displacement, or $\gamma_{min} \approx d_p$. This relation defines the minimum volume and weight of liquid in the chamber as a function of the maximum lens power such that $$V_{liquid} \geq \frac{\pi \cdot r_t^2 \cdot P_{max}}{2(n-1)}. \quad (27)$$

Equations (25), (26), and (27) are useful to estimate some of the liquid lens parameters. For example, for an optical power change of +3D with glycerol as the optical fluid and using first membrane 302 radius of 18 mm, piston radius of 16 mm, and bottom membrane radius of 20 mm, the required piston displacement is 0.511 mm which is also the minimum gap. The minimum glycerin volume is thus $\approx 1.3$ cm$^3$. For glycerin with density, $\rho_o = 1.26$ g/cc, this corresponds to a minimum liquid weight of 1.64 gr. Practically speaking, the lens weight can also be affected by the thickness and weight of the frame.

The force required to move the piston also depends on the initial tension parameter, T. The first and second membranes 302 and 304 can be made of polydimethylsiloxane (PDMS) with thicknesses of 1.2 mm and 0.2 mm, respectively, and in one example. The Young modulus and tension of these membranes can vary significantly depending on the PDMS mixture formulation and curing cycle. These parameters can be measured using the deflection method described in Yang et al. (Q. Yang, P. Kobrin, C. Seabury, S. Narayanaswamy, and W. Christian, "Mechanical modeling of fluid-driven polymer lenses," Applied Optics 47(20), 3658-3668 (2008)). The value of Young's modulus, Poisson's ratio, and pre-strain were 987.6 kPa, 0.49, and 2.83%, respectively. This pre-strain yields a pre-tension of 33.5 N/m. The calculated piston force required at the highest optical power (+3 D) was 0.75N or 76 gm consistent with these parameters.

The deformation of the first membrane 302 is not only subject to the piston force but also the effects of gravity. If the lens is standing upright on its edge, gravity produces hydrostatic pressure which increases linearly from the top to the bottom of the lens. This hydrostatic pressure adds to that of the piston thus producing a non-spherical deformation and asymmetric bulging of the diaphragm. This lens shape distortion produces a significant amount of coma aberration that must be minimized for acceptable optical performance. The deformation of membranes under symmetric hydrostatic pressure is given as $$u_h = \frac{\rho_o g r_t^3 \cos\theta(1-\rho^2)}{8T}\left[1 - \frac{2(I_1(\beta) - I_2(\rho\beta))}{\beta(1-\rho^2)I_2(\beta)}\right], \quad (28)$$

where g is the gravitational acceleration (9.8 m/s²), θ is the angle respect to the vertical axes, and $I_2( )$ is the second order modified Bessel functions of the first kind. The hydrostatic pressure produces an S-type deflection that adds to the symmetric deflection of equation (3). The net effect of the distortion is that the optical power at the top is lower than at the bottom of the lens (when the lens is vertical, as worn by a wearer). The slope of the distorted lens power at its center can be calculated from the mean curvature of equation (28) as, $$\left.\frac{\partial P_{opt}}{\partial r}\right|_{r=0} \approx \frac{\rho_o g}{2 \cdot T}(n-1)\left[1 - \frac{\beta^2}{8 I_2(\beta)}\right]. \tag{29}$$

For T=33.54 N/m and aperture radius of 16 mm, considering 80% radius of the maximum aperture, the variation of the optical power from the center of the first membrane 302 is about ±1 D. This variation adds to the piston-driven power of equation (26). The calculated and measured slopes of the optical power at the center of the lens are 0.084 D/mm and 0.1 D/mm respectively. The power uniformity and quality of the lens image however can be arbitrarily improved if the tension is increased at the expense of a larger piston force which can also be implemented.

There are several ways to digitally control the piston deflection and lens power. A simple effective and always stable scheme uses sliding mode control (SMC). In SMC for each of the three bimorph actuators one can incorporate a displacement sensor. of the lens the microcontroller calculates the displacement error Ek and the rate of change of the error If the actuators are controlled by pulse width modulator signals, the PWM duty cycle is set to PWM=f($\varepsilon_k$). If the frequency response of the actuators is much smaller than that of the control PWM signals, this results in averaging of the PWM signal to produce very smooth control of the actuator displacement and lens power.

In the examples of FIGS. 1-3C, the lens aperture can be 32 mm while the power required to actuate the piston can be less than 100 mW, and in some cases, between 10 and 20 mW. The assembled lens unit can also be very lightweight, such as approximately 15 grams, because of the implementation of curved bimorphs, which can weigh less than 1 gram each for a 32 mm aperture lens, thereby resulting in a 42 mm diameter lens, for instance. Such lens can have a total thickness of approximately 8.4 mm, a total weight of approximately 16 grams, and an optical range of 5-7 diopters. This is a dramatic improvement over existing systems that require much more power and weight to change a focal length of a much smaller lens aperture (e.g., 10 mm or less).

Figure 4:
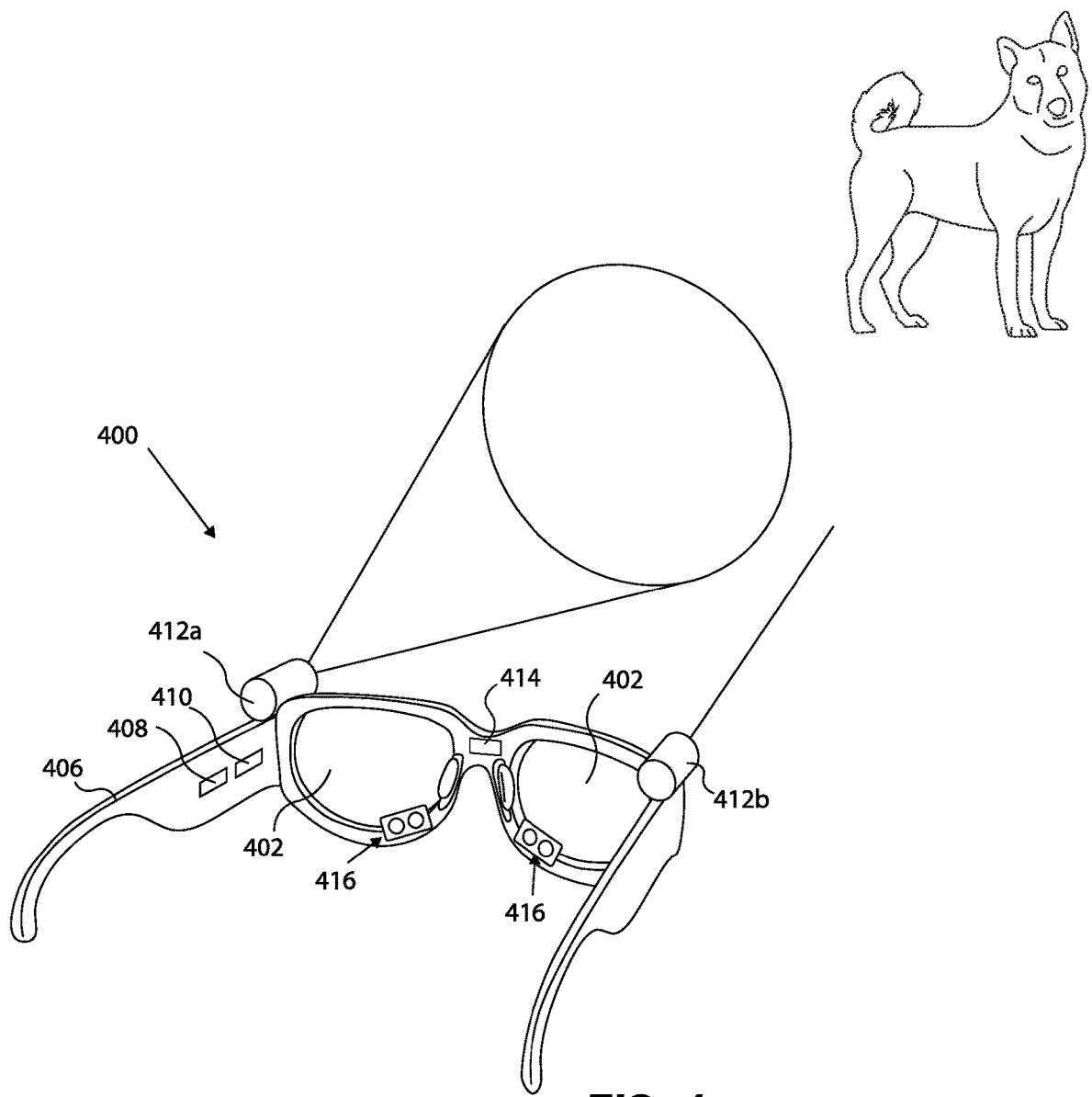
FIG. 4 is an isometric view of smart eyeglasses having variable focus optical devices in accordance with an example of the present disclosure.

FIG. 4 illustrates smart eyeglasses 400 having a pair of variable focus optical devices 402 (i.e., lenses), such as described with reference to FIGS. 1-3C, in accordance with an example of the present disclosure. In one aspect, the eyeglasses 400 can comprise a frame 406 supporting a battery 408, a microcontroller 410, an object distance sensor (412a,b or 414), and an optional pair of eye tracking sensors 416. At a minimum, a single object distance sensor 414 can be used. Alternatively, multiple distance sensors can be used to increase accuracy. The microcontroller 410 can be supported within the frame and electrically coupled to the battery 408 and to each of the variable focus optical devices 402, the object distance sensor (412 or 414), and the pair of eye tracking sensors 416. The battery 408 can be an 8 gm 110 mAh LiPo battery that is rechargeable via a port in the frame 406, for instance. The components on FIG. 4 are shown schematically for illustration purposes, but as will be appreciated from below, the components are selected for their relative size and power capabilities to form lightweight smart glasses.

The microcontroller 410 can be operatively coupled to each variable focus optical devices 402 to control a focal length of each lens, as further discussed above. Any suitable low-power microcontroller may be used. The microcontroller 410 can optionally have a wireless interface that wirelessly communicates with an external computer system, such as a smart phone or tablet via a Bluetooth, BLE (or other wireless protocol) connection. Thus, a custom developed software application (for android and iOS devices) can be configured to control the focal point of the lenses 402 by causing the microcontroller 410 to actuate respective pistons according to a particular focal length desired based on a distance to an object viewed by the wearer and a user baseline focal length or his eyeglass prescription. Alternatively, the microcontroller 410 can be programmed to control a focal length of each variable focus optical devices 402. The app is used to upload user settings such as the eyewear prescription. The type of vision defect (farsightedness, nearsightedness, and other types), as well as parameters related to the speed of the control loop (how often the adaptive lenses are updated), distance measuring options, filtering options, extended battery life options, and various other types of parameters. The microcontroller can also be used to store the weared vision behavior such as the distance to the object over time. This data can be stored in the microcontroller and later downloaded by the app from the set microcontroller.

In one example, the object distance sensor can comprise a camera 412a and a laser 412b mounted on either side of the frame 406, in one aspect. The camera 412a can be a subminiature CCD or CMOS camera such as the Awaiba Naneye and the Omnivision camera cube families, and the laser 412b can be mounted such that its laser beam is congruent with the line of sight of the wearer. The laser 412b can illuminate a small spot on an object (e.g., the dog), and the spot is recorded on the camera. The location of the spot is a function of the object distance. Laser triangulation distance measurement systems are very common, and work well over extended distances of several hundred meters.

In an alternative example, the object distance sensor can comprise an ultrasonic transducer 414 that sends acoustic pulses to an object and then used to "listen" to an echo from the sound reflection on the object. The object distance is equal to the echo time (or time of flight "TOF") divided by twice the speed of ultrasound. Commercial ultrasonic distance sensors can resolve distances of 1 mm over a range of 5 m. Thus, the object distance sensor 414 can be a TOF distance sensor based on light. Infrared based TOF rangers can be used for distance measurement and 3D mapping of objects. For example, ST Micro produces microelectronics (VL6180X, VL53L0X). The entire TOF subsystem is less than 5 mm in length but is capable of measuring distances up to 5 m with a nominal 5 mW power dissipation. Other non-limiting examples include using Intel's Realsense and Infineon (IRS10x0c) TOF depth cameras.

In conjunction with the object distance sensor (412a,b or 414), the optional eye tracking sensors 416 can be utilized to determine which object being viewed while the distance sensor determines its distance from the eyeglasses 400. Eye tracking sensors can improve autofocusing performance to focus on desired objects. Eye tracking is the process of measuring either the point of gaze (where the wearer is looking) or the motion of an eye relative to the head. An eye tracker is a device for measuring eye positions and eye movement. These sensors can be used to determine the location of an observed object in the visual field, which ultimately is used to determine the object distance from the depth camera data. Each eye tracking sensor 416 can comprise an infrared LED and a miniature camera embedded in the frame 406 near the respective lens. The reflected light (provided by the LED) from the eye can be captured by the camera to estimate eye and the gaze angle. Based on this information the gaze point can be calculated and the object distance can be determined from the object distance sensor (412a,b or 414). Non-limiting examples of suitable eye tracking sensors can include subminiature CMOS cameras such as the Awaiba NanEye and Omnivision camera cubes.

In addition to the camera type schemes for eye tracking, electro-occulography can be utilized. This technique only requires the recording of electrode signals with electrodes placed at the nose support and the temples (for x axis gaze). Electrooculography (EOG) is a technique for measuring the corneo-retinal standing potential that exists between the front and the back of the human eye. The resulting signal is called the electrooculogram. Primary applications are in ophthalmological diagnosis and in recording eye movements. Unlike the electroretinogram, the EOG does not measure response to individual visual stimuli. To measure eye movement, pairs of electrodes are placed either above and below the eye or to the left and right of the eye. If the eye moves from center position toward one of the two electrodes, this electrode "sees" the positive side of the retina and the opposite electrode "sees" the negative side of the retina. Consequently, a potential difference occurs between the electrodes. Assuming that the resting potential is constant, the recorded potential is a measure of the eye's position. While the resolution of EOG is not quite as good as that obtained by cameras due to the compactness of the technique and low cost (only requiring a few wires), it can be readily and effectively implemented with the frame 406 and microprocessor 410 for eye tracking devices and methods. The placement of the EOG electrodes can also be consistent with the frame 406 adjacent the nose of the wearer.

Fixed power eyeglasses cannot restore the full visual range of vision, but variable power adaptive glasses can restore the full range if the lens accommodating range is $$\Delta P_{lens} > (\Delta P_{eye}) \text{normal} - \Delta P_{eye} \quad (30)$$

In the worst case possible the defective eye has zero accommodation hence $\Delta P_{lens} = (\Delta P_{eye})_{lens} \approx 7\text{-}10$ diopters. The lens power required to bring an image in focus depends on the object distance; therefore the use of an adaptive lens can also benefit from a distance sensor, such as described above.

In one example using a smartphone application, the system settings and default lens power can be controlled by a phone application where the user inputs (via the application) a specific eyeglass prescription vector consisting of the corrective fixed powers for the left and right eyes. Once set, the prescription vector is wirelessly sent to the smart eyeglasses where it is registered. The smart glasses continuously measure (and record) the distance from the lens to the object plane. Next, it calculates the required corrective lens power to bring the object into focus and changes the adaptive lens power accordingly. There are several potential schemes for performing the correction. In the simplest scheme one may assume that the observer has zero accommodation and $(P_{eye})_0$ is fixed. Since $$\frac{1}{f_o} = (P_{eye})_0 + P_{lens} \quad (31)$$

Therefore:

$$\frac{1}{f_o} = (P_{eye})_0 + P_{lens} \quad (32)$$

$$P_{lens} = \frac{1}{s_o} + \frac{n_i}{s_i} - (P_{eye})_0 = \left(A + \frac{1}{s_o}\right) \quad (33)$$

where A is a constant. Therefore, the lens power must be adjusted with a 1/so dependence. Since the values of $s_i$ are known, the constant A can be determined from the eyeglass prescription vector $S=(p_l, p_r)$. For presbyopia or hyperopia, the prescription is for reading glasses, typically experimentally found to produce a comfortable sharp image at a reading distance with $s_o = d_{read} = 25$ cm. Therefore the adaptive lens power obeys $$\vec{P}_{lens}(d) = \vec{S}_{read} + \left(\frac{1}{d} - \frac{1}{d_{read}}\right) \cdot \vec{n} \quad (34)$$

while for myopia prescription one can use $$\vec{P}_{lens}(d) = \vec{S}_{myop} + \frac{1}{d} \cdot \vec{n} \quad (35)$$

Other more sophisticated relations between the lens power and object distance can be used to minimize the lens electrical power. For example, one may adjust the lens focus only when the eye needs it (by using equations above) over a restricted set of distances or with an abrupt or smoothed boundary. A significant parameter in these devices is the distance from the lens to the object of interest. This distance can be measured using time-of-flight microsensors, cameras and eye tracking sensors, such as those described above. The eye tracker determines the direction of the object. A fixed direction vector normal to the eyeglass center, which only requires a single TOF distance measurement, may be used in the system.

An advantage of the smart glasses is the ability to continuously record the visual and motional activity of the observer and its correlations that may be used as a measure of the eyeglasses effectiveness. The eyeglass microcontroller (e.g., 410) can record object distance versus time as well as head elevation angle. This information can be supplemented with additional location data from its corresponding tethered phone or tablet to construct an accurate record of the observer daily visual activities such as reading, walking, and driving. For example, if the visual acuity of the observer is adversely drifting, the record will display longer and wider adjustments of reading distance or may result in a longer response time during driving. The analysis of this data can be used to determine when the user may require a different prescription setting or when to visit an eye doctor for assistance. The lens, based on data analysis, can be configured to make adjustments to the prescription, thus reducing needs for doctor visits.

In one test of smart eyeglasses with a human eye emulator, a phone camera, a variable focusing lens, and a servo-driven gimbaled stage, quantitative measurements can be utilized of the clarity of the image and the response of the adaptive glasses under various simulated accommodation disorders. The testing included a combination of large-aperture fluidic lenses, ultralight actuators, object distance and eye direction sensors, and embedded control, communications and computing electronics. A helmet mounted unit can be incorporated to utilize the fluidic lenses with adjustment attachments. The attachments can be connected to two stepper motors that adjust the lens focal distance through a microcontroller. The distance to object measurement can be performed with a digital ultrasonic range sensor (Maxbotix). The entire system can be controlled using an 84 MHz Arduino Due board connected via a bluetooth interface. One important aspect is the distance sensor. Ultrasonic sensors in particular are subject to many reflections; thereby a quality distance sensor can be highly useful in minimizing distance measurement errors. Based on these observations, utilization of light-based time-of-flight sensing devices can be used. The weight and size of the components can also be commercially balanced. The speed of actuation also can be commensurate with the typical time used in head and eye movements ~0.5 seconds.

Adaptive liquid lenses, which are based on physical adjustment of the lens shape as discussed herein, have the advantages of intrinsic smooth interface, adaptively tuned or reconfigured output, polarization insensitive, broadband, and vibration resistance (if two density-matched liquids are employed). Some applications for such lenses include cellphone cameras, image processing, optical communication, sensors and vision devices. Various operating principles can be used, such as, but not limited to: fluidic pressure, electrochemistry, thermal effect, environmentally adaptive hydrogel, electro-wetting, and dielectrophoresis. Among these, fluidic pressure can be the most straightforward way to dynamically manipulate the optical interface formed by liquids.

The smart eyeglasses 400 are capable of recording the visual and motion behavior of the observer to determine the eyeglass effectiveness and degradation of the observer vision accommodation. This information can be recorded on the microprocessor 410 and periodically downloaded to its tether phone/table for further analysis and adaptive adjustment of prescription settings. This ata can be uploaded to an online database. The information can also be used to alert the observer when eye vision has significantly drifted and the data could be shared with eye doctors for further analysis. The networking capability could also lead to smart eyeglass broadcast communications between the observer home (lighting control, etc.) and ultimately vehicles and work environment computers.

Although the above smart eyeglass 400 can be particularly effective, the actuators can alternatively be driven via manual adjustments. For example, a simple switch or set of buttons can allow a user to manually increase or decrease focal length and power. In this case, the switch can be coupled to a limiter which connects to the actuators which are still powered by a battery. This can decrease weight and cost compared to the more elaborate configurations described above at a sacrifice of focusing speed.

In one image testing example (using the variable focus optical device described herein), a number of components were utilized, such as a collimated light source, a tunable neutral density filter, a mount for the variable focus optical device, and a sophisticated Shack-Hartmann wavefront (SHS) sensor (e.g., Thor labs WFS150-7AR) connected to a laptop. The SHS sensor measures the curvature of the light wavefront after it passes through the variable focus optical device. It is also capable of measuring the aberrations of the variable focus optical device via Zernike polynomial expansion coefficients. These optical components are mounted on an optical table. SHS sensors allow for the rapid determination of focal lengths and lens powers without further adjustments of object and image distances (hence setup is fixed).

SHS sensor software can be used in testing a variable focus optical device for light when the lens power is +2 (focal length 500 mm). To evaluate lens optical performance and image quality, the lens aberrations were measured with the SHS using a 4f optical test setup. The wavelength of the collimated test light source can be 0.625 μm. The aberration values at no actuation (0.78 D), lens convex, and concave states are shown in the following Table 2:

TABLE 2

| Aberration | Optical power +0.8 D | Optical power +3 D | Optical power −1 D |
|---|---|---|---|
| Astigmatism 45° | −0.364 μm | −0.354 μm | 0.376 μm |
| Astigmatism 90° | −0.380 μm | 0.343 μm | 0.400 μm |
| Trefoil X | −0.008 μm | −0.035 μm | −0.056 μm |
| Trefoil Y | −0.007 μm | −0.385 μm | 0.070 μm |
| Coma X | 0.298 μm | −0.208 μm | −0.153 μm |
| Coma Y | −0.7400 μm | −0.264 μm | −0.608 μm |
| Spherical | −0.068 μm | −0.188 μm | −0.119 μm |
| RMS Aberration | 0.958 μm | 0.733 μm | 0.846 μm |

The main contributor for root-mean-square (RMS) wavefront aberration at 0.78 D (no actuation) was coma. Coma aberration is proportional to the third power of the radius of the lens and inversely proportional to the membrane tension as shown in the following equation:

$$u_h = \frac{\rho_o g r_l^3 \cos\theta (1-\rho^2)}{8T}\left[1 - \frac{2(I_1(\beta)-I_2(\rho\beta))}{\beta(1-\rho^2)I_2(\beta)}\right]. \tag{36}$$

In one performance test, coma aberration was worst at no actuation and it decreased significantly at higher optical power. Spherical aberration was very small at no actuation and it increased a little at high optical power. The low values of spherical aberration are indicative of the tension dominated membrane deflection. The value of trefoil aberration also increased from negligible value to 0.385 μm as the lens optical power increased because the actuators applied forces at three different points 120 degrees apart along the periphery. All these aberration values except coma are relatively small and below 0.5 μm which is the approximate RMS value of human lens aberration. The 80 percent encircled energy radii of the point spread function (PSF) were also measured at three different lens optical powers. The values were 0.1 degrees, 0.065 degrees, 0.065 degrees at lens optical power +0.8D, +3D and −1D, respectively.

Figure 5A:
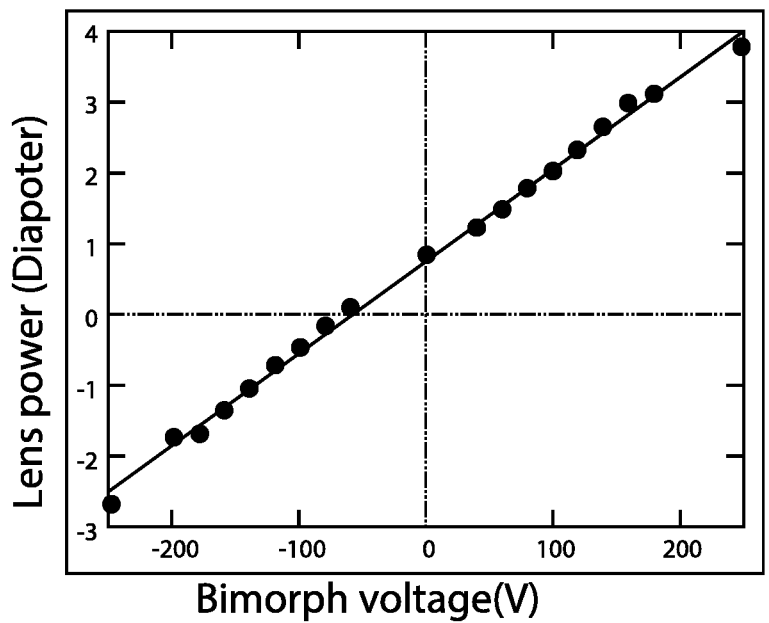
FIGS. 5A-5C are each graphs illustrating performance of a variable focus optical device in accordance with an example of the present disclosure.

FIG. 5A is a graph of voltage vs. lens optical power, illustrating one example of performance results of a variable optical device (e.g., a lens), such as described herein. If the voltage is applied and increased in a positive direction to three curved bimorphs (e.g., 112*a-c*) the three bimorph actuators along with the piston (e.g., 110) move in an inward direction (e.g., FIG. 3B), as further discussed above. For negative voltage, the piston moves outward making the lens concave (e.g., FIG. 3C), as further discussed above. Thus, FIG. 5A, shows the lens optical power (at the lens center) as a function of actuator voltage. In one test, the lens has an offset power of +0.78 D (Diopters) when unpowered. The lens optical power ranged in between −2.03 D to +3.57 D for a voltage range of −250 V to +250 V, which was below depolarization voltage. The lens optical power is linearly proportional with the actuator voltage. The resulting slope can be S=13 mD/V.

Figure 5B:
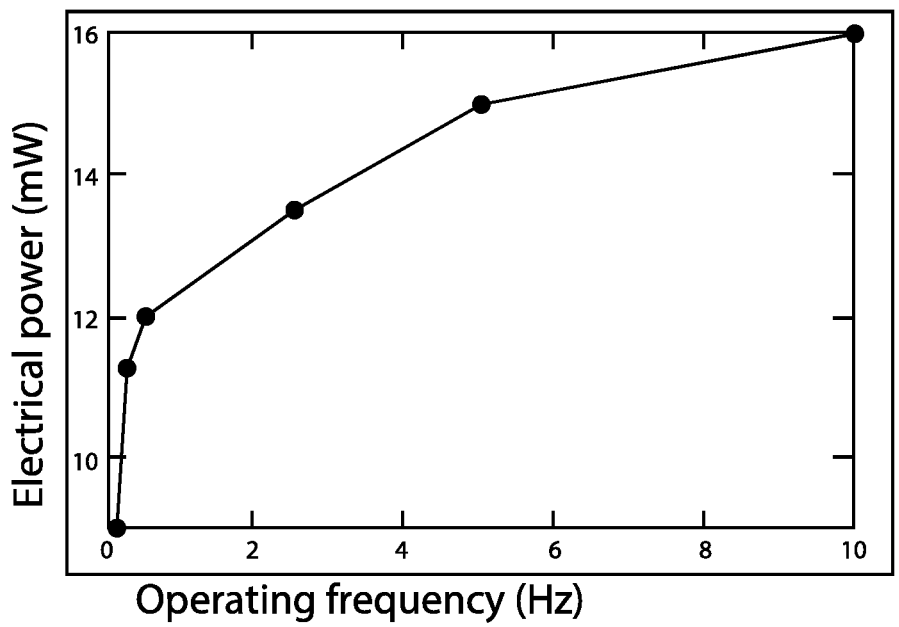
Figure 5C:
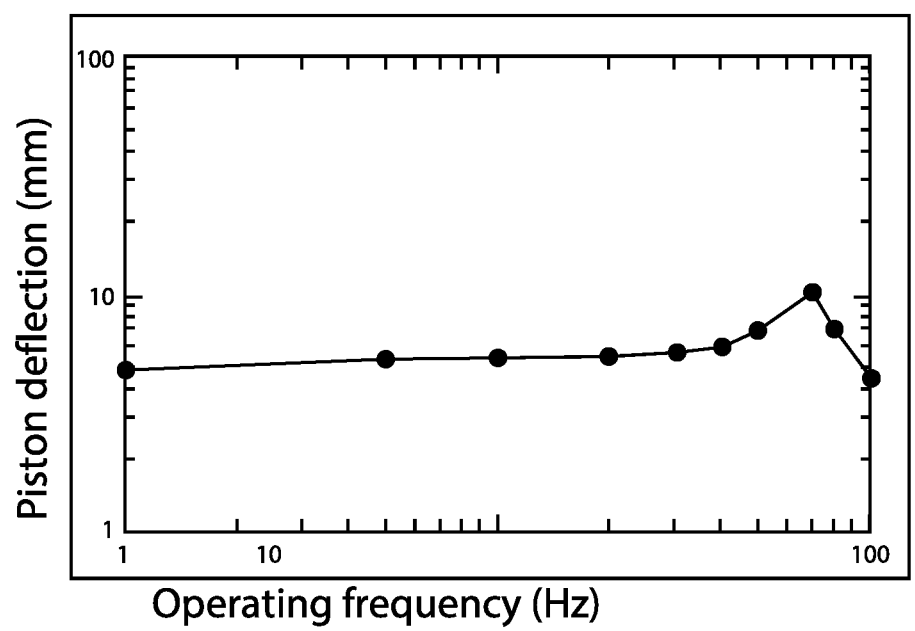

FIG. 5B is a graph of electrical power (mW) vs. operating frequency (Hz), and FIG. 5C is a graph of piston deflection (mm) vs. operating frequency (Hz), illustrating one example of performance results of a variable optical device (e.g., as lens), such as described herein. The electrical power dissipation for a lens is relatively very small, in the range of 10-20 mW. This is ideal low power performance as the lenses can be operated from lightweight rechargeable portable batteries, such as with an 8 gm, 110 mAh LiPo battery, such that the lens can continuously operate for about 6 hours and have a battery life of about 12 hours. One of the important advantages for piezoelectric bimorph actuators is the zero static power consumption; hence battery lifetime can be significantly extended if the focal change frequency is reduced. The mechanical resonance of the structure/frame determines the speed of response for the lens. The frequency response of the lens is measured by observing the deflection of the lens piston (via a bouncing laser beam) projected onto a screen as a function of bimorph driving frequency. The lens displays a resonant frequency of about 70 Hz, which is illustrated on FIG. 5C as the uppermost point on the graph. The lens can be operated continuously for more than 500 cycles with the driving circuit in the voltage range of −220 V to +220 V without observing any failure or significant performance degradation. It can also be actuated intermittently for more than 6 months without any failure, in one performance test.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A variable focus optical device, comprising:
a first membrane;
a second membrane, wherein, together with the first membrane, the second membrane at least partially defines a chamber;
an optically transparent liquid disposed in the chamber;
a piston positioned adjacent the second membrane; and
at least one actuator coupled to the piston and configured to indirectly deform the first membrane upon actuation to change a focal length of the variable focus optical device by changing a position of the piston to deflect the second membrane and the optically transparent liquid.

2. The device of claim 1, wherein the piston is coupled with the second membrane.

3. The device of claim 2, wherein the piston is transparent, at least in part.

4. The device of claim 1, wherein the at least one actuator comprises a piezoelectric actuator.

5. The device of claim 3, wherein the at least one actuator comprises a curved bimorph actuator comprising a passive layer and an active layer, and wherein the curved bimorph actuator is configured to both bend and rotate upon actuation.

6. The device of claim 4, wherein the at least one actuator comprises a plurality of curved bimorph actuators, and wherein each of the plurality of curved bimorph actuators is at least substantially equally spaced apart and together the plurality of curved bimorph actuators circumferentially surround the chamber.

7. The device of claim 5, wherein each of the plurality of curved bimorph actuators is coupled to the piston with a pivoting pin.

8. The device of claim 6, wherein the piston comprises a plurality of piston connecting portions protruding radially from the piston, and wherein each of the plurality of curved bimorph actuators is coupled to the piston within a hole formed in each of the plurality of piston connecting portions.

9. The device of claim 1, wherein the variable focus optical device comprises eyeglasses.

10. A variable focus optical device, comprising:
a frame;
a pair of lenses coupled to the frame, wherein each lens comprises:
a first membrane;
a second membrane, wherein, together with the first membrane, the second membrane at least partially defines a chamber;
an optically transparent liquid disposed in the chamber;
a piston positioned adjacent the second membrane; and
at least one actuator pivotally coupled to a connecting portion of the piston and circumferentially positioned about the chamber, wherein the at least one actuator is configured to indirectly deform the first membrane upon actuation to change a focal length of the lens by changing a position of the piston to deflect the second membrane and the optically transparent liquid.

11. The variable focus optical device of claim 10, wherein the at least one actuator comprises a plurality of curved bimorph actuators.

12. The variable focus optical device of claim 10, wherein the connecting portion extends from the piston.

13. The variable focus optical device of claim 10, wherein the at least one actuator is pivotally coupled to the connecting portion with a pivoting pin extending in a hole.

14. A pair of smart eyeglasses, comprising:
a frame;
a pair of lenses coupled to the frame, wherein each lens comprises:
a first membrane;
a second membrane, wherein, together with the first membrane, the second membrane at least partially defines a chamber;
an optically transparent liquid disposed in the chamber;
a piston positioned adjacent the second membrane; and
at least one actuator positioned adjacent to a periphery of the chamber and coupled to the piston, wherein the at least one actuator is configured to indirectly deform the first membrane upon actuation to change a focal length of the lens by changing a position of the piston to deflect the second membrane and the optically transparent liquid;
an object distance sensor coupled to the frame and configured to measure a distance from the eyeglasses to an object; and
a microcontroller coupled to the frame and operatively coupled to the object distance sensor, wherein the microcontroller is configured to facilitate actuating the at least one actuator to adjust a focal length of each lens according to data received from the object distance sensor.

15. The smart eyeglasses of claim 14, wherein the at least one actuator is pivotally coupled to the chamber.

16. The smart eyeglasses of claim 15, wherein the at least one actuator is indirectly pivotally coupled to the chamber.

17. The smart eyeglasses of claim 15, further comprising at least one connecting portion, wherein each actuator of each of the at least one actuator is pivotally coupled to a connecting portion of the at least one connecting portion, and wherein each connecting portion of the at least one connecting portion is coupled to the chamber.

18. The smart eyeglasses of claim 16, further comprising a piston, wherein each connecting portion of the at least one connecting portion extends from the piston.

19. The smart eyeglasses of claim 17, wherein the at least one actuator comprises a plurality of curved bimorph actuators, wherein each of the plurality of curved bimorph actuators is at least substantially equally spaced apart and together the plurality of curved bimorph actuators circumferentially surround the chamber, and wherein each of the plurality of curved biomorph actuators is pivotally coupled to a connecting portion of the piston by way of a pivoting pin.

\* \* \* \* \*